United States Patent [19]
Bonniot et al.

[11] Patent Number: 5,490,629
[45] Date of Patent: Feb. 13, 1996

[54] ROCKET ENGINE NOZZLE WITH AN ENGINE DIFFUSER

[75] Inventors: Claude Bonniot, Vernon; Didier Vuillamy, Quincampoix; Pierre Desclos, Vernon; Etienne Tiret, La Chapelle Reanville; André Beaurain, Chambly, all of France

[73] Assignee: Societe Europeenne de Propulsion, Suresnes, France

[21] Appl. No.: 248,968

[22] Filed: May 25, 1994

[30] Foreign Application Priority Data

May 28, 1993 [FR] France .................................. 93 06454

[51] Int. Cl.[6] .................................................... F02K 9/97
[52] U.S. Cl. ............................ 239/265.15; 239/265.19
[58] Field of Search .......................... 239/265.15, 265.11, 239/265.19; 60/229, 271

[56] References Cited

U.S. PATENT DOCUMENTS

| | | | |
|---|---|---|---|
| 2,880,576 | 4/1959 | Kappus | 60/271 |
| 2,937,494 | 5/1960 | Johnson | 60/271 |
| 3,237,402 | 3/1966 | Steverding | 239/265.15 |
| 3,357,658 | 12/1967 | Ewing | 60/229 |
| 4,077,572 | 3/1978 | Fitzgerald | 239/265.17 |
| 4,434,614 | 3/1984 | Gill et al. | 239/265.15 |
| 7,925,982 | 12/1975 | Mueller | 60/242 |

FOREIGN PATENT DOCUMENTS

| | | |
|---|---|---|
| 2457390 | 12/1980 | France . |
| 2503794 | 10/1982 | France . |
| 2568316 | 1/1986 | France . |
| 2618488 | 1/1989 | France . |

OTHER PUBLICATIONS

"Confined Jet Thrust Vector Control Nozzle Studies", J. H. Friddell, et al, 4549 Journal of Propulsion and Power 8(1992) Nov./Dec., No. 6, Washington, D.C. U.S.

Primary Examiner—Andres Kashnikow
Attorney, Agent, or Firm—Weingarten, Schurgin, Gagnebin & Hayes

[57] ABSTRACT

The downstream portion of the diverging part of the nozzle of the rocket engine is extended by an ejectable diffuser which, downstream from the zone where it is connected to the diverging part, presents a zone of smaller cross-section that acts during a first stage of flight in the presence of significant outside pressure to recompress the flow of hot gases and to prevent a flow separation from appearing along with the wall of the diverging part. The ejectable diffuser may have a streamlined throat which constitutes the zone of smaller cross-section.

10 Claims, 3 Drawing Sheets

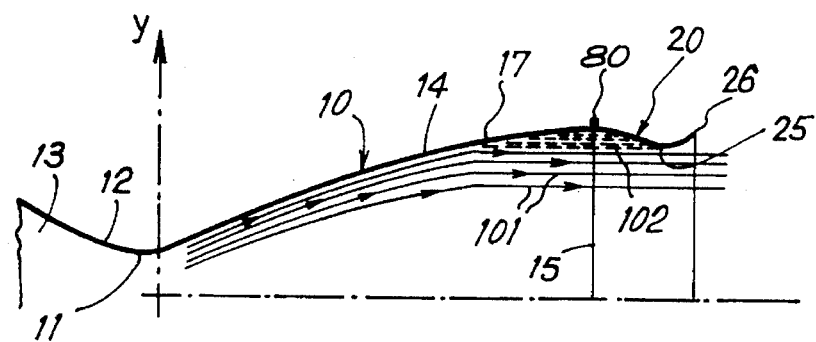
FIG. 1A
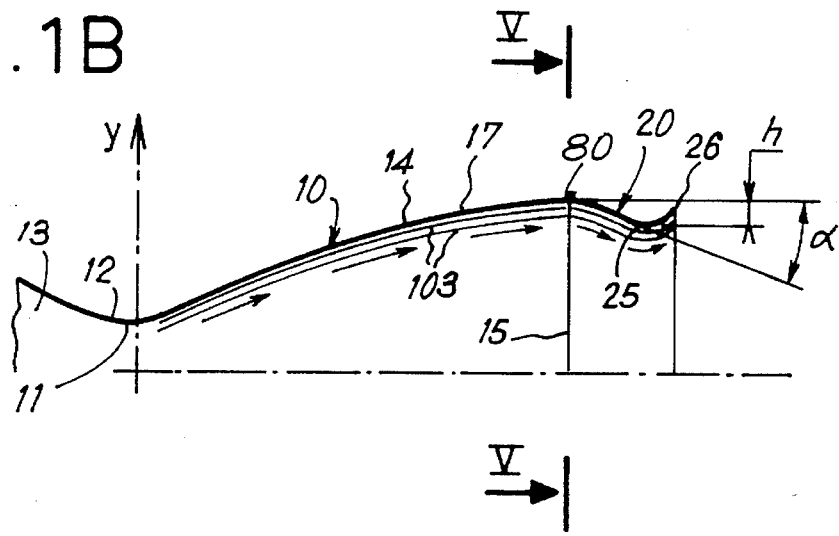
FIG. 1B
FIG. 2
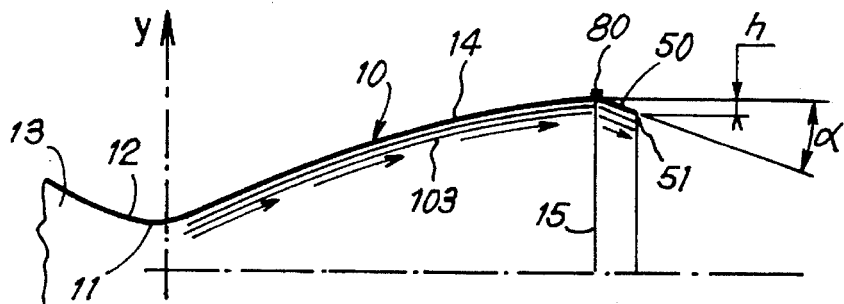

ROCKET ENGINE NOZZLE WITH AN ENGINE DIFFUSER

FIELD OF THE INVENTION

The invention relates to rocket engine nozzles and more particularly to nozzles which are intended to operate in an outside environment of varying pressure and which comprise means for matching the diverging part to the varying ambient conditions in flight.

PRIOR ART

Under given conditions, it is possible to achieve close matching of a nozzle of a rocket engine used to propel a first stage of a launcher, at only a single altitude corresponding to a predetermined ambient pressure. Nozzles are generally optimized as a function of the overall performance of a stage, which in most cases leads to overexpanded nozzles, providing thrust which is at a maximum at a relatively high "matching" altitude. At the matching altitude, the static pressure Pe of the gases in the outlet section of the nozzle becomes equal to the ambient pressure Pa which is relatively low. The matching altitude may be situated for example at about ten kilometers above the ground. Throughout the phase of flight from the ground up to the matching altitude, the static pressure Pe of the gases in the outlet section of the nozzle is very substantially lower than ambient pressure. In this phase, during which the nozzle is overexpanded and particularly on starting when the ambient pressure Pa corresponds to atmospheric pressure at ground level, a phenomenon exists whereby the jet separates from the wall of the diverging part, which limits the expansion ratio of the gases i.e. the ratio between the pressure Po in the combustion chamber and the static pressure Pe of the gases in the outlet section of the nozzle.

In order to avoid the phenomenon of jet separation, it has already been proposed, for example in document FR-A-2503794, to use on starting and at low altitude a diverging part which has a smaller outlet cross-section and which is installed inside a diverging part of larger outlet cross-section. When the rocket engine has reached an altitude such that the diverging part of larger outlet cross-section can operate without risk of jet separation, the internal diverging part of smaller cross-section is separated and released.

Such a system for matching a rocket engine nozzle is not entirely satisfactory as it requires the small internal diverging part to be connected to the throat of the nozzle which is at a very high temperature, so that its structure is relatively complex. Implementing two complete diverging parts nested like Russian dolls also tends to increase the weight of the assembly.

It has also been proposed, particularly in documents FR-A-2568316 and FR-A-2457390, to implement variable geometry nozzles comprising a first diverging part which is relatively short and of relatively small cross-section and which is used during a first phase of flight from the ground, and one or more lengths forming further diverging parts which can be connected downstream from the first diverging part to prolong it and create an outlet of larger cross-section once the rocket engine has reached a certain altitude where the ambient pressure is low. Such types of nozzle with deployable diverging parts improve the matching of the rocket engine during different phases of flight, but also increase structural complexity, cost, and on-board weight, and does not always guarantee sufficient reliability of operation when account is taken of the fragility of the deployment mechanisms and of the difficulty in providing correct alignment of the different lengths of diverging part in the presence of loads due to the jet re-attaching on the lengths.

In addition to the problems related to the deployment system per se, the use of a deployable diverging part on a rocket engine also puts constraints on the design of the engine.

It is also known, in particular from documents U.S. Pat. No. 3,925,982 and FR-A-2618488, to use a diverging part of fixed cross-section ratio, having a relatively large outlet cross-section which optimizes operation at altitude in an environment of low outside pressure, and to use, at a predetermined distance along the outlet section, means for stabilising the separation of the gas jet from the wall of the diverging part, on starting and during a first phase of flight at low altitude. However, until now, proposals have been to stabilise the separation of the jet essentially by injecting an annulus of fluid through the wall of the diverging part. The requirement to use fluid and to control its injection within the diverging part increases the complexity of the system and tends to reduce its reliability.

OBJECTS AND BRIEF SUMMARY OF THE INVENTION

The present invention seeks to overcome the above-mentioned difficulties and to allow good matching of a rocket engine nozzle to different flight conditions from the ground up to an altitude at which ambient pressure is low, without using any additional parts adjacent to the throat of the nozzle or mechanisms for deploying extension pieces for the diverging part or of fluid injection systems.

The invention seeks to give good matching ability to a rocket engine nozzle and satisfactory overall efficiency, using static means only to overcome the problems connected with the phenomenon of jet separation.

These objects are achieved using a rocket engine nozzle with an ejectable diffuser, comprising a convergent portion which receives the gases produced in a combustion chamber, a nozzle throat of small cross-section (So) and a diverging part connected to the nozzle throat and terminating at its downstream portion in a gas jet outlet cross-section (Se) which defines a high cross-section ratio ($\epsilon$=Se/So) greater than about 50, wherein the downstream portion of the diverging part is extended by an ejectable diffuser which, downstream from the zone where it is connected to the diverging part, presents a zone of smaller cross-section (S1) that acts during a first stage of flight in the presence of significant outside pressure to recompress the flow of hot gases and to prevent a flow separation from appearing along the wall of the diverging part.

The cross-section (S1) of the zone of the diffuser of smaller cross-section constitutes about 15% to 45% of the outlet cross-section (Se) of the diverging part.

In practice, the smallest cross-section of the releasable diffuser should correspond substantially to the cross-section of the diverging part in the zone where separation of the gas jet would occur, at low altitude and in the absence of the diffuser.

Because of the addition of a releasable diffuser which ensures recompression of the flow, the invention avoids the appearance of jet separation once the transient ignition phase is over, and also prevents the appearance of asymmetric loads on the diverging part.

Once the rocket engine is at sufficient altitude for jet separation to be unlikely to occur, the diffuser is ejected so as to allow the jet to spread out over the entire outlet cross-section of the diverging part. The diffuser is readily ejected since it is outside the diverging part and does not come inside the diverging part.

In a first possible embodiment, the ejectable diffuser has an essentially frusto-conical shape with an angle of inclination ($\alpha$) less than or equal to about 20° with respect to a direction parallel to the axis of the nozzle.

In another advantageous embodiment, the ejectable diffuser has a streamlined throat which constitutes said zone of smaller cross-section (S1).

The throat diffuser may have upstream of the throat an inlet section with a curved profile to ensure more progressive recompression of the flow.

The ejectable diffuser may be unitary or constructed of a plurality of parts.

According to a particular feature of the invention, a system of partitions or ribs is installed inside the downstream portion of the diverging part and the diffuser so as to restrain resulting gas flow in the circumferential direction during the transient ignition phases, to ensure reinforcement of the wall of the diverging part and support of the diffuser, and to act as guides during ejection of the diffuser.

In a first possible embodiment, the inside surface of the diverging part includes longitudinal ribs which extend beyond its downstream end and co-operate with longitudinal grooves formed on the inside surface of the releasable diffuser.

In another possible embodiment, which facilitates guidance during ejection of the diffuser, the inside surface of the releasable diffuser includes longitudinal ribs which extend beyond the downstream end of the diffuser and co-operate with longitudinal grooves formed on the inside surface of the diverging part.

The releasable diffuser comprises means for selectively connecting it to the downstream end of the diverging part.

Rupture of these connection means may be remotely controlled by pyrotechnical, pneumatic, or electrical means.

In another possible embodiment, the means for connecting the releasable diffuser to the downstream end of the diverging part comprise means configured so as to break automatically after a predetermined operating time.

These automatic rupturing means may comprise elements made of an abradable composite material, for example.

In a particular embodiment, the means for connecting the releasable diffuser to the downstream end of the diverging part comprise an assembly of hinged clamps which grip flanges formed at the contacting ends of the diverging part and of the releasable diffuser, and a retaining system for the clamps which is equipped with unlocking means selectively controllable to allow release of the diffuser once the risk of separation of the gas jet inside the diverging part has passed.

BRIEF DESCRIPTION OF THE DRAWINGS

Other features and advantages of the invention will be apparent from the following description of particular embodiments of the invention, given by way of example, and with reference to the accompanying drawings, in which:

FIG. 1A is a schematic axial half-section view of a nozzle of a first embodiment of the invention with a throat diffuser, during an initial transient ignition phase, FIG. 1B is a view similar to that of FIG. 1A during a phase of flight at low altitude where the throat diffuser ensures that the gas jet reforms along the wall of the diverging part, FIG. 2 is a schematic axial half-section view of nozzle of a second embodiment of the invention with a frusto-conical diffuser, during a phase of flight at low altitude where the diffuser prevents separation of the gas jet in the diverging part.

DETAILED DESCRIPTION OF PARTICULAR EMBODIMENTS OF THE INVENTION

Figure 3:
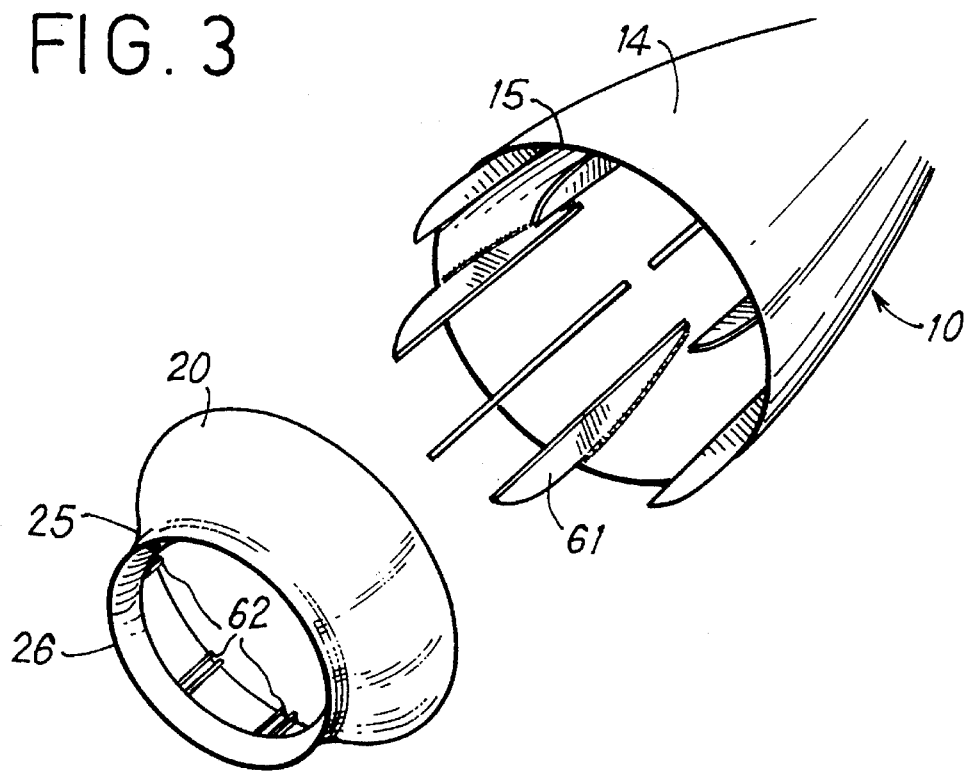
FIG. 3 is an exploded perspective view showing a particular embodiment of a nozzle of the invention, with a throat diffuser co-operating with a diverging part provided with longitudinal ribs.

FIGS. 1A, 1B and 2 show the general form of a rocket engine nozzle 10 comprising an upstream converging portion 12 which receives the hot gases produced in a combustion chamber 13, a nozzle throat 11, and a diverging part 14 which ensures the expansion of the hot gases downstream of the throat 11 and ejection of the gases from the downstream end 15 of the diverging part which has an outlet cross-section Se.

The cross-section ratio $\epsilon$ between the outlet cross-section Se of the diverging part and the cross-section So where the gases pass through the throat 11 of the nozzle defines an expansion factor. The expansion ratio of the nozzle 10 is in fact defined by the ratio between the pressure Po in the combustion chamber and the static pressure Pe of the gases in the outlet section of the nozzle, and the expansion ratio depends directly on the cross-section ratio $\epsilon$.

It is generally desired to have the largest possible expansion ratio, and therefore cross-section ratio $\epsilon$, so as to obtain large thrust.

However, as already indicated, thrust is maximised only if the nozzle is matched, i.e. if the static pressure Pe of the gases in the outlet section of the nozzle is equal to the pressure Pa of the ambient surroundings.

If the nozzle is matched for operation at high altitude, where the ambient pressure Pa is very low, the nozzle is overexpanded at ground level where the static pressure Pe of the gases in the outlet section of the nozzle is very much less than ambient pressure Pa which is then equal to 1 bar, and with conventional diverging parts, this gives rise to a phenomenon whereby the jet of hot gases separates from the inside wall of the diverging part 14. This jet separation phenomenon causes asymmetrical and unstable mechanical loads on the diverging part and can therefore lead to its destruction.

Proposals have therefore already been made to use quite complex means for stabilising the separation of the jet with the aid of systems for injecting gas, or more generally to limit the length of the diverging part and its outlet section so as to avoid the jet separation phenomenon at low altitude. This results in a loss of thrust at high altitude or in the requirement to add nozzle extension systems at high altitude which complicate the structure of the assembly considerably and thus make it fragile.

By way of example, consider a conventional nozzle of a rocket engine for the first stage of a launcher, where the cross-section ratio of the nozzle is limited to $\epsilon=45$ to guarantee that no jet separation can occur at ground level or at very low altitude. This corresponds to a nozzle which is matched to an outside pressure of the order of 0.4 bar, but which is overexpanded for outside pressures of less than 0.4 bar, i.e. for altitudes above 8 to 10 km. The thrust therefore remains limited for all phases of the flight above about 10 km.

The invention offers a simple means for improving the matching of a nozzle over a more extended operating range by preventing the occurrence of the jet separation phenomenon at low altitude whilst still making it possible to use a nozzle of geometry having a high cross-section ratio $\epsilon$, of the order of 80 to 100 for example, which ensures good matching and therefore improved thrust at high altitudes above about 10 km, where the ambient pressure is low.

To achieve this, a diffuser 20 (FIGS. 1A and 1B) or 50 (FIG. 2) is attached to the downstream end 15 of the diverging part to recompress the flow and to prevent separation from appearing.

The diffuser 20 or 50, has an inlet cross-section equal to the outlet cross-section Se of the downstream end 15 of the diverging part 14, and has, downstream of that inlet section, a zone 25 or 51 of smaller cross-section S1 than that of the outlet cross-section Se of the diverging part 14.

The zone 25 or 51 of the diffuser 20 or 50 may have a cross-section S1 which is about 15% to 45% smaller than the outlet cross-section Se of the diverging part 14.

Generally, the smaller cross-section S1 should correspond to the cross-section of the diverging part at the region where separation of the jet appears at ground level, for a diverging part which is not equipped with a diffuser 20 or 50.

Taking into account the characteristics of the nozzle, if separation of the jet is likely to appear for example at a cross-section S'1 of the diverging part defining a cross-section ratio $\epsilon 1=S1/So$ of about 45, the smaller zone 25 or 51 of the diffuser 20 or 50 should have a cross-section S1 similar to the cross-section S'1.

As can be seen in FIGS. 1A and 1B and 2, the diffuser 20 or 50 may have different shapes.

In a first embodiment, shown in FIGS. 1A, 1B and 3 to 5, the releasable diffuser 20 added to the downstream end 15 of the diverging part 14 and attached to it by temporary connecting means 80, is streamlined so as to have a throat 25 defining the zone of smaller cross-section. The portion of the diffuser 20 which is situated upstream of the throat 25 may be curved so as to give a more progressive re-compression up to the throat 25. The diffuser 20 terminates in a downstream portion 26 which widens out relative to the throat 25.

The profile of the diffuser 20 is such that it has a maximum slope (angle $\alpha$) of about 20° with respect to a direction parallel to the axis of the nozzle. The angle $\alpha$ may for example lie in the range 5° to 10°.

The transverse distance h between the throat 25 and a line which is an axial prolongment of the downstream end of 15 of the diverging part may, for example, be of the order of 10 cm to 40 cm, but of course depends on the dimensions of the diverging part 14.

Represented in FIG. 1A is the flow 101 of the jet of hot gases in the diverging part 14 during an initial transient ignition phase at ground level. During a first time period, the gas jet tends to separate from the wall of the diverging part 14, in a zone 17 which corresponds, for example, to a gas pressure of the order of 0.4 bar, taking into account the outside pressure of the order of 1 bar which is greater than the conditions for non-separation of the jet. During a first time period there is therefore formed, downstream of the zone 17, a dead zone 102 in which there is no flow adjacent the wall of the downstream portion of the diverging part.

Immediately after the initial transient phase, the dead zone 102 is purged and the flow 103 of the jet (FIG. 1B) normally stabilises again and attaches to the wall of the diverging part 15 and subsequently to the diffuser 20 right up to the outlet 26 of the diffuser.

When the rocket engine is at sufficient altitude, for example of the order of 10 km, where the outside pressure is sufficiently low that there is no risk of jet separation occurring in the diverging part, the diffuser 20 is separated from the diverging part 14 at the connecting means 80, the diffuser being ejected so that the entire outlet section Se is released from the downstream end 15 of the diverging part 14.

The invention therefore allows the diverging part 14 to be optimized for operation at high altitude, because of its large outlet cross-section, whilst still maintaining good efficiency during all phases of flight, with the diffuser 20 preventing jet separation at low altitude.

It should be noted that various conventional methods exist for predicting the location at which jet separation will occur in an asymmetrical nozzle, and that the difficulty consists not in predicting the location of the separation but in overcoming or preferably preventing the separation so as to prevent the appearance of instabilities.

The methods for determining the location of the jet separation use criteria which relate the properties of the flow upstream of the separation to the characteristics of the flow downstream of the separation. A common method consists in calculating the flow through the nozzle when placed in a non-viscous fluid, to determine the characteristics of the flow adjacent the wall, and in then applying one of the separation criteria.

By way of example, if Mo represents the Mach Number of the flow before separation and P2 and P1 represent the static pressures before and after separation, the following separation criteria may be chosen:

$$\text{Zukoski criterion } \frac{P2}{P1} = 1 + \frac{Mo}{2}$$

$$\text{Summerfield criterion } \frac{P1}{P2} = (1.88\, Mo - 1)^{-0.64}$$

The static pressure P2 downstream of the separation may be taken as equal to the outside pressure.

To a first approximation, the Mach number Mo may be chosen to be equal to 3.

$$\text{We therefore have the condition } \frac{P1}{P2} \approx 0.4$$

Close to the ground, where the outside pressure P2 is about 1 bar, separation therefore occurs when the static pressure P1 of the flow of the ejected gas reaches or goes below about 0.4 bar.

FIG. 2 shows a second embodiment of the invention in which a diffuser 50 of essentially frusto-conical shape is used. In this case, as for the throat diffuser 20, the inlet cross-section of the conical diffuser 50 corresponds to the outlet cross-section of the diverging part 14, but the restricted zone of cross-section S1 of the diffuser 50 is constituted by its outlet cross-section. The diffuser 50 is connected to the diverging part 14 by temporary connection means 80 as in the case of the throat diffuser 20.

The frusto-conical diffuser 50 has an angle of inclination a which is less than or equal to 20° with respect to a direction parallel to the axis of the nozzle.

As in the case of the throat 25 of diffuser 20, the downstream end 51 of the frusto-conical diffuser 50 may be situated at a transverse distance h lying in the range of about 10 cm to 40 cm from a direction parallel to the axis of the nozzle and passing through the downstream end 15 of the nozzle.

The phenomenon of recompression of the gases produced by the frusto-conical diffuser 50 is similar to that produced by the throat diffuser 20 and will not be described again. The diffuser 50 is likewise separated from the diverging part 14 and ejected when the rocket engine reaches an altitude sufficient that the jet remains naturally adherent.

A nozzle of the invention has two levels of matching, one at low altitude in the presence of a diffuser, and the other at high altitude after ejection of the diffuser, given that it has a diverging part of large outlet cross-section.

This dual matching is made possible simply by adding a static element, namely, the diffuser 20 or 50, during the first phase of the flight.

This technique has the advantage of allowing different existing diverging parts to be used and of enabling these to be matched to different types of launch by adding diffusers with different characteristics.

The presence of a diffuser at the outlet of the diverging part during the first phase of flight also allows the diverging part to be made rigid and assists it in supporting the forces due to outside pressure. Moreover, releasing the diffuser 20 or 50 will not damage the diverging part 14, since the diffuser is always situated at the outlet of the diverging part.

Figure 5:
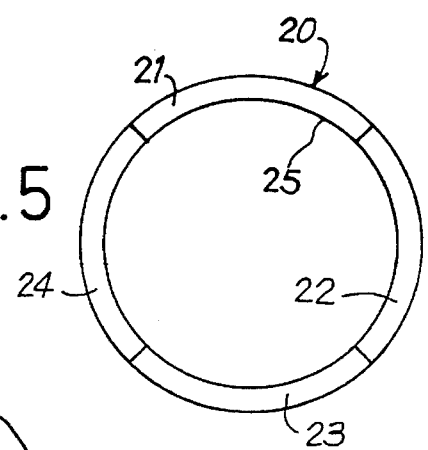
FIG. 5 is a section along line V—V of FIG. 1B showing a throat diffuser made up of a plurality of portions.

The diffuser 20 or 50 may be a unitary part or, as shown in FIG. 5, it may comprise a plurality of elements, such as the lengths 21 to 24, thus facilitating its fabrication.

Figure 4:
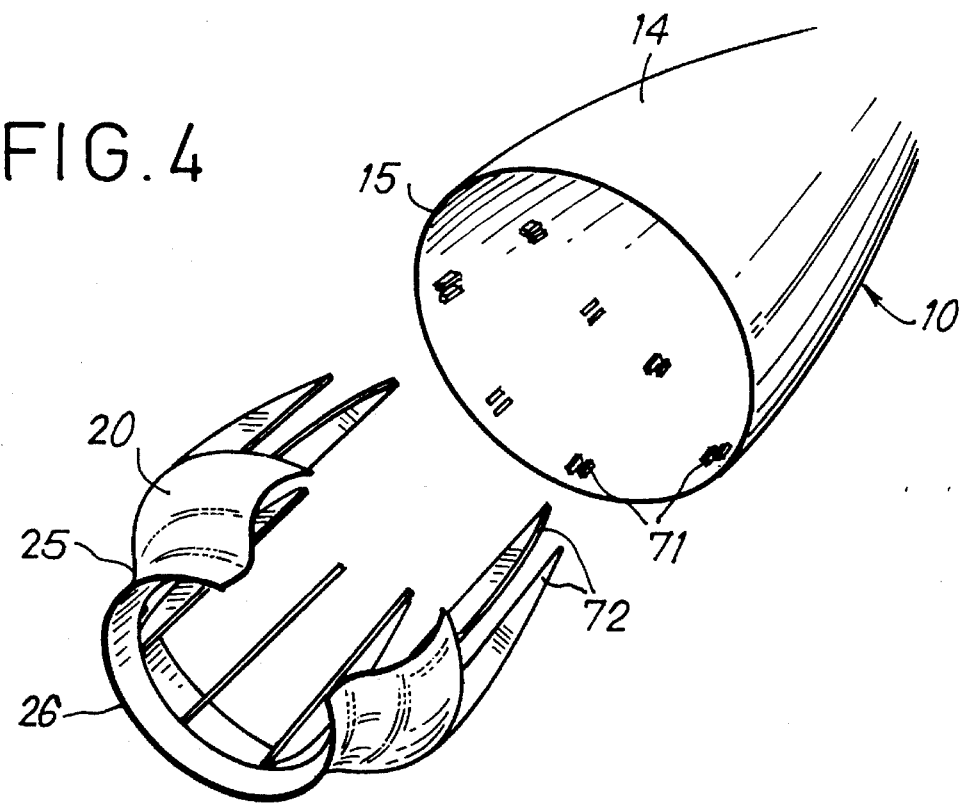
FIG. 4 is an exploded perspective view showing another particular embodiment of a nozzle of the invention, with a throat diffuser provided with longitudinal ribs co-operating with a diverging part.

FIGS. 3 and 4 show the use of longitudinal partitions 61, 72 which ensure that the diffuser 20 is guided relative to the diverging part 14. FIGS. 3 and 4, which are exploded views showing the diffuser 20 separated from the diverging part 14, relate to a diffuser 20 with a throat 25, but the partitions 61, 72 may likewise be installed in an embodiment having a frusto-conical diffuser 50.

FIG. 3 shows the partitions or ribs 61 which are disposed longitudinally and secured to the downstream portion of the inside surface of the diverging part 14. The ribs 61, which are regularly spaced around the periphery of the diverging part 14 and may be 6 to 12 in number, for example, project beyond the downstream end 15 of the diverging part 14 to penetrate into the diffuser and engage in corresponding grooves 62 formed on the inside surface of the diffuser. The ribs 61 serve to make the diverging part rigid, to reinforce the connection between the diffuser 20 and the diverging part 14, to guide the diffuser as it is ejected and to limit recirculation of the hot gases.

FIG. 4 shows an embodiment which is very similar to that of FIG. 3, but in which the ribs or partitions 72 are integral with the diffuser 20 and project downstream of that diffuser to enter corresponding grooves 71 formed in the downstream portion of the inside surface of the diverging part 14. The ribs 72 of FIG. 4 perform exactly the same function as the ribs 61 of FIG. 3.

Figure 6:
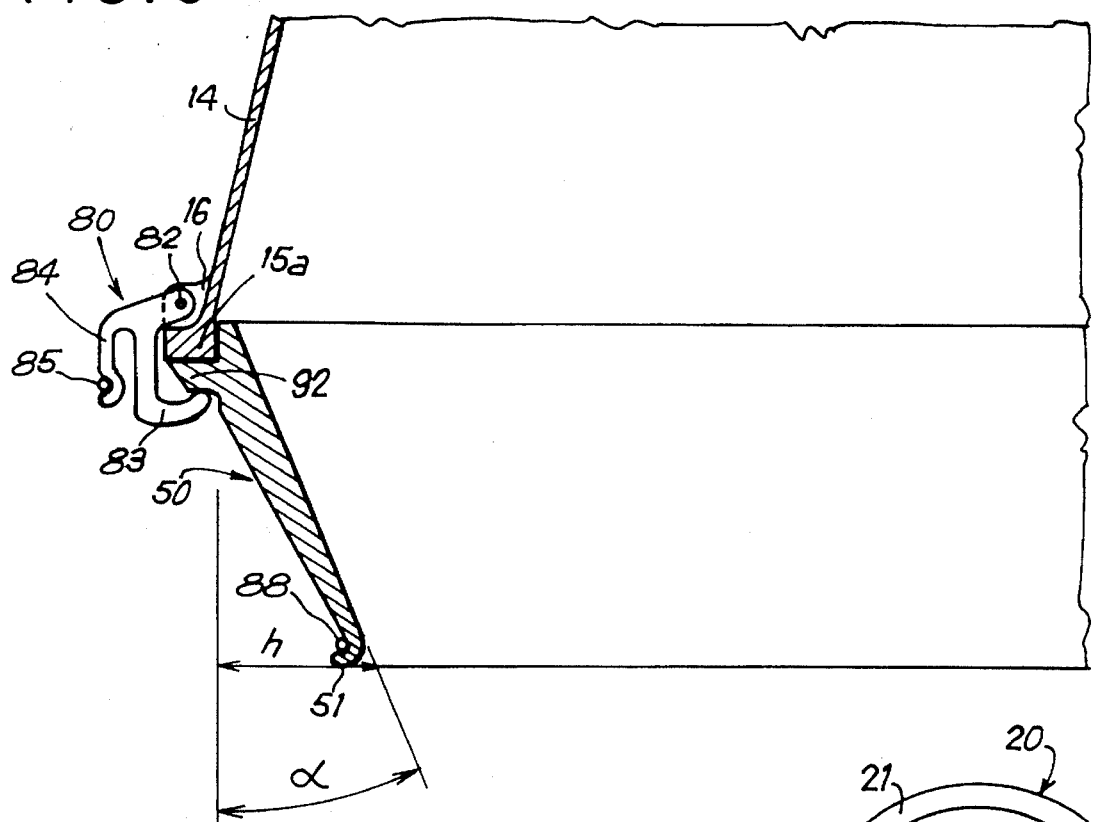
FIG. 6 is an axial section showing a part of a possible system for connecting a releasable diffuser to the downstream portion of a nozzle of the invention.
Figure 7:
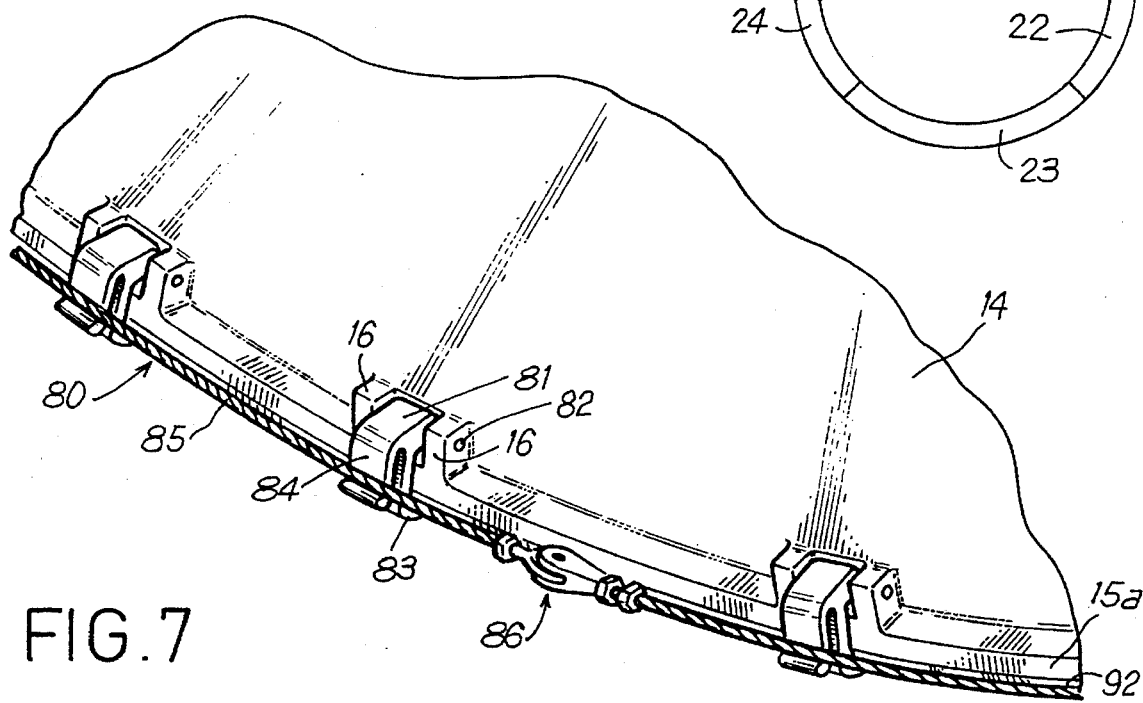
FIG. 7 is a perspective view of a portion showing the possible connection system of FIG. 6.

FIGS. 6 and 7 show a particular example of the connection 80 between a diffuser 50, which is shown as a frusto-conical diffuser but could equally be a throat diffuser 20, and the downstream end 15 of a diverging part 14.

Generally, the connection means 80 are designed to be broken after a predetermined time of operation when the rocket engine has reached sufficient altitude for the outside pressure to be small. Once the connecting means 80 have ruptured, the diffuser is separated from the diverging part 14 and ejected.

Rupture of the connecting means 80 can be effected by remote control using pyrotechnical, pneumatic or electrical means. For example, it is possible to use a pyrotechnical fuse or explosive bolts.

Rupture of the connecting means may also be activated automatically after a predetermined time, of the order of several tens of seconds, for example, by using a locking element which may for example be in the form of an abradable composite material. The control of the rupture of the connecting means 80 may therefore be of the active type or of the passive type.

In a particular embodiment, a vaporizable foam may coat the diffuser 20 or 50 to cool the explosive bolts during a predetermined time period until the instant at which rupture of the connecting means 80 is commanded.

In the example of an embodiment of the connecting means 80, as given in FIGS. 6 and 7, the downstream end 15 of the diverging part 14 can be seen to be provided with a flange 15a, the upstream end of the diffuser 50 also having a flange 92. The flanges 15a and 92 are held by clips 81 hinged about axes 82 mounted on yokes 16 formed at the downstream end of the diverging part 14.

Each clip or clamp 81 may comprise a hook 83 engaged under the flange 92 and an exterior tongue 84 provided with a notch receiving a cable 85 which surrounds the downstream end of the diverging part 14 and which is connected to a tensioning and locking system 86. When the system 86 unlocks, the cable 85 relaxes, releasing the clips 81 and thereby allowing the ejection of the diffuser 50 as they move away.

When the diffuser 20 or 50 is made up of a plurality of portions, the downstream end 51 of the diffuser 50 (FIG. 6) may grip a retaining ring 88 which holds the various portions mechanically in place.

We claim:

1. A rocket engine nozzle of the first stage of a launcher with an ejectable diffuser, comprising a convergent portion which receives the gases produced in a combustion chamber, a nozzle throat of small cross-section and a diverging part connected to the nozzle throat and terminating at its downstream portion in a gas jet outlet cross-section which defines a high cross-section ratio greater than about 50, wherein the downstream portion of the diverging part is extended by an ejectable diffuser which, downstream from the zone where it is connected to the diverging part, presents a zone of smaller cross-section that acts during a first stage of flight in the presence of significant outside pressure to recompress the flow of hot gases and to prevent a flow separation from appearing along the wall of the diverging part.

2. A nozzle according to claim 1, wherein the cross-section of the zone of the diffuser of smaller cross-section constitutes about 15% to 45% of the outlet cross-section of the diverging part.

3. A nozzle according to claim 1, wherein the ejectable diffuser has an essentially frusto-conical shape with an angle of inclination less than or equal to about 20° with respect to a direction parallel to the axis of the nozzle.

4. A nozzle according to claim 1, wherein the ejectable diffuser has a streamlined throat which constitutes said zone of smaller cross-section.

5. A nozzle according to claim 1, wherein the ejectable diffuser is made up of a plurality of parts.

6. A rocket engine nozzle of the first stage of a launcher with an ejectable diffuser, comprising a convergent portion which receives the gases produced in a combustion chamber, a nozzle throat of small cross-section and a diverging part connected to the nozzle throat and terminating at its downstream portion in a gas jet outlet cross-section which defines a high cross-section ratio greater than about 50, wherein the downstream portion of the diverging part is extended by an ejectable diffuser which, downstream from the zone where it is connected to the diverging part, presents a zone of smaller cross-section that acts during a first stage of flight in the presence of significant outside pressure to recompress the flow of hot gases and to prevent a flow separation from appearing along the wall of the diverging part, and wherein the inside surface of the diverging part includes longitudinal ribs which extend beyond its downstream end and co-operate with longitudinal grooves formed on the inside surface of the releasable diffuser.

7. A rocket engine nozzle of the first stage of a launcher with an ejectable diffuser, comprising a convergent portion which receives the gases produced in a combustion chamber, a nozzle throat of small cross-section and a diverging part connected to the nozzle throat and terminating at its downstream portion in a gas jet outlet cross-section which defines a high cross-section ratio greater than about 50, wherein the downstream portion of the diverging part is extended by an ejectable diffuser which, downstream from the zone where it is connected to the diverging part, presents a zone of smaller cross-section that acts during a first stage of flight in the presence of significant outside pressure to recompress the flow of hot gases and to prevent a flow separation from appearing along the wall of the diverging part, and wherein the inside surface of the releasable diffuser includes longitudinal ribs which extend beyond the downstream end of the diffuser and co-operate with longitudinal grooves formed on the inside surface of the diverging part.

8. A nozzle according to claim 1, wherein the releasable diffuser comprises means for selectively connecting it to the downstream end of the diverging part and wherein the rupture of these connection means is remotely controlled.

9. A nozzle according to claim 1, wherein the means for connecting the releasable diffuser to the downstream end of the diverging part comprise means configured so as to break automatically after a predetermined operating time.

10. A rocket engine nozzle of the first stage of a launcher with an ejectable diffuser, comprising a convergent portion which receives the gases produced in a combustion chamber, a nozzle throat of small cross-section and a diverging part connected to the nozzle throat and terminating at its downstream portion in a gas jet outlet cross-section which defines a high cross-section ratio greater than about 50, wherein the downstream portion of the diverging part is extended by an ejectable diffuser which, downstream from the zone where it is connected to the diverging part, presents a zone of smaller cross-section that acts during a first stage of flight in the presence of significant outside pressure to recompress the flow of hot gases and to prevent a flow separation from appearing along the wall of the diverging part, and wherein the means for connecting the releasable diffuser to the downstream end of the diverging part comprise an assembly of hinged clamps which grip flanges formed at the contacting ends of the diverging part and of the releasable diffuser, and a retaining system for the clamps which is equipped with unlocking means selectively controllable to allow release of the diffuser once the risk of separation of the gas jet inside the diverging part has passed.

* * * * *

UNITED STATES PATENT AND TRADEMARK OFFICE
CERTIFICATE OF CORRECTION

PATENT NO. : 5,490,629
DATED : February 13, 1996
INVENTOR(S) : Claude Bonniot et al It is certified that error appears in the above-indentified patent and that said Letters Patent is hereby corrected as shown below:

Title page,
    Item [54], Title, "ROCKET ENGINE NOZZLE WITH AN ENGINE DIFFUSER", should read --ROCKET ENGINE NOZZLE WITH AN EJECTABLE DIFFUSER--;

Column 1, line 2, in the Title, "ROCKET ENGINE NOZZLE WITH AN ENGINE DIFFUSER" should read --ROCKET ENGINE NOZZLE WITH AN EJECTABLE DIFFUSER--.

Signed and Sealed this

Twenty-sixth Day of August, 1997

Attest:

BRUCE LEHMAN

Attesting Officer    Commissioner of Patents and Trademarks